US012162024B2

(12) United States Patent
Jaffrey

(10) Patent No.: US 12,162,024 B2
(45) Date of Patent: Dec. 10, 2024

(54) CONDENSING VAPOR

(71) Applicant: Nouvel Technologies, Inc., White Plains, NY (US)

(72) Inventor: Kamal Jaffrey, Winchester, MA (US)

(73) Assignee: Nouvel Technologies, Inc., White Plains, NY (US)

( * ) Notice: Subject to any disclaimer, the term of this patent is extended or adjusted under 35 U.S.C. 154(b) by 546 days.

(21) Appl. No.: 17/289,451

(22) PCT Filed: Oct. 31, 2019

(86) PCT No.: PCT/US2019/059176
§ 371 (c)(1),
(2) Date: Apr. 28, 2021

(87) PCT Pub. No.: WO2020/092779
PCT Pub. Date: May 7, 2020

(65) Prior Publication Data
US 2022/0001392 A1   Jan. 6, 2022

Related U.S. Application Data

(60) Provisional application No. 62/754,673, filed on Nov. 2, 2018, provisional application No. 62/779,847, filed
(Continued)

(51) Int. Cl.
*B01D 53/26* (2006.01)
*B01D 53/30* (2006.01)
(Continued)

(52) U.S. Cl.
CPC ............ *B03C 3/0175* (2013.01); *B01D 53/26* (2013.01); *B01D 53/30* (2013.01); *B01D 53/323* (2013.01);
(Continued)

(58) Field of Classification Search
CPC ........ B01D 53/26; B01D 53/30; B01D 53/32; B03C 3/017; B03C 3/36; B03C 3/47; B03C 3/68; F03D 9/00; F28C 1/16
See application file for complete search history.

(56) References Cited

U.S. PATENT DOCUMENTS 2,778,443 A * 1/1957 Yereance ................ F24F 8/192
209/128
4,273,146 A   6/1981 Johnson
(Continued)

FOREIGN PATENT DOCUMENTS

CN         1654128 A    8/2005
CN       101806488 A    8/2010
(Continued)

*Primary Examiner* — Sharon Pregler
(74) *Attorney, Agent, or Firm* — Mintz, Levin, Cohn, Ferris, Glovsky and Popeo, P.C.

(57) ABSTRACT

An aerosol condensing system is provided. The aerosol condensing system includes a source electrode electrically connected to an electrical source that applies an electrical voltage to the source electrode, a condenser including a sink electrode to collect aerosol contained in an air stream to the
(Continued)

sink electrode, and a duct configured to direct the aerosol to the condenser. The source electrode and the sink electrode creates an electrical field within the duct.

20 Claims, 17 Drawing Sheets

Related U.S. Application Data on Dec. 14, 2018, provisional application No. 62/903,596, filed on Sep. 20, 2019.

(51) Int. Cl.
*B01D 53/32* (2006.01)
*B03C 3/017* (2006.01)
*B03C 3/36* (2006.01)
*B03C 3/47* (2006.01)
*B03C 3/68* (2006.01)
*F03D 9/00* (2016.01)
*F28C 1/16* (2006.01)

(52) U.S. Cl.
CPC .............. *B03C 3/368* (2013.01); *B03C 3/47* (2013.01); *B03C 3/68* (2013.01); *F03D 9/00* (2013.01); *F28C 1/16* (2013.01)

(56) References Cited

U.S. PATENT DOCUMENTS

| | | | |
|---|---|---|---|
| 5,598,971 A | 2/1997 | Winther et al. | |
| 6,264,111 B1 | 7/2001 | Nicolson et al. | |
| 2003/0079982 A1 | 5/2003 | Josephson et al. | |
| 2004/0149132 A1* | 8/2004 | Pasic | B03C 3/09 96/84 |
| 2009/0146425 A1 | 6/2009 | Widisky | |
| 2010/0313761 A1* | 12/2010 | Tanaka | B03C 3/08 96/52 |
| 2011/0289951 A1 | 12/2011 | Furlong et al. | |
| 2022/0001392 A1* | 1/2022 | Jaffrey | B01D 53/323 |

FOREIGN PATENT DOCUMENTS

| | | |
|---|---|---|
| CN | 108105945 A | 6/2018 |
| JP | 2018530709 A | 10/2018 |
| WO | 2009104411 A1 | 8/2009 |
| WO | 2016051868 A1 | 4/2016 |
| WO | 2017058949 A1 | 4/2017 |
| WO | 2017143255 A1 | 8/2017 |

* cited by examiner

FIG. 5A

APPLYING ELECTRICAL FIELD (S110)

CONDENSING AEROSOL (S120)

COLLECTING CONDENSED DROPLETS (S130)

FIG. 5B

BLOWING AIR STREAM (S205)

APPLYING ELECTRICAL FIELD (S210)

CONDENSING AEROSOL (S220)

COLLECTING CONDENSED DROPLETS (S230)

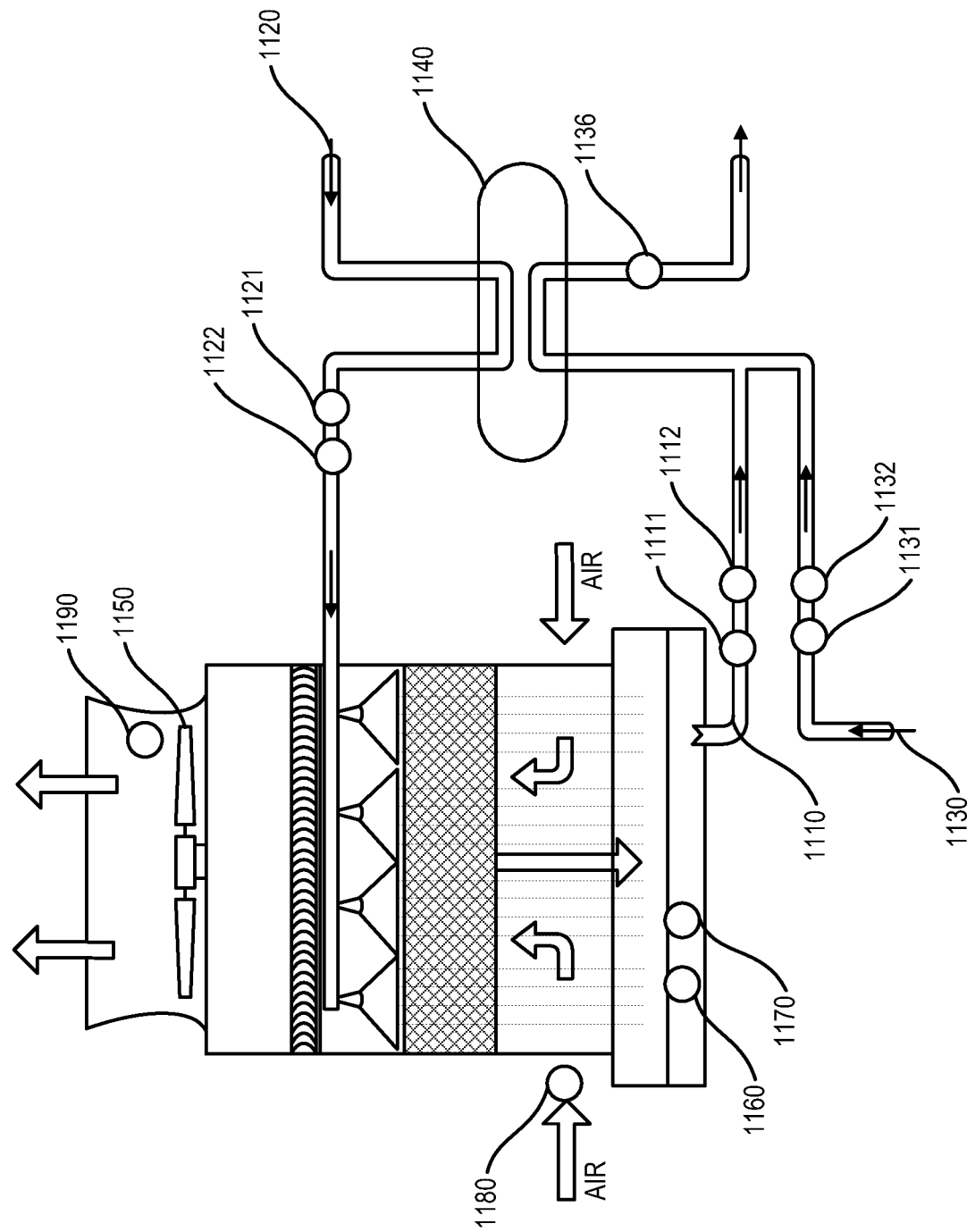

CONDENSING VAPOR

CROSS-REFERENCE TO RELATED APPLICATIONS

This application is a national stage application filed under 35 U.S.C. 371, of International Patent Application No. PCT/US2019/059176 filed Oct. 31, 2019, which claims priority from U.S. Provisional Application Nos. 62/754,673 filed on Nov. 2, 2018; 62/779,847 filed on Dec. 14, 2018; and 62/903,596 filed on Sep. 20, 2019, the disclosures of each of which are hereby expressly incorporated herein by reference in their entirety.

TECHNICAL FIELD

The current subject matter is generally related to condensing vapor, for example, water vapor condensing systems.

BACKGROUND

Scavenging water can be a sustainable solution to water scarcity problems in many regions around the world. Desalination is a form of purifying liquid, especially water, and refers to a process that removes some amount of salt and other minerals from saline water. Via desalination, salt water can be converted to fresh water suitable for human consumption, irrigation, or other uses. Due to relatively high-energy consumption, the costs of desalinating seawater are generally higher than the alternatives (e.g., fresh water from rivers or groundwater, water recycling, water conservation, and the like), but alternatives are not always available. Reverse osmosis is another process for purifying water. However, reverse osmosis uses expensive membranes and high-pressures, which requires significant energy.

SUMMARY

An aspect of the present disclosure provides an aerosol condensing system. The system may include a source electrode electrically connected to an electrical source that applies an electrical voltage to the source electrode, a condenser including a sink electrode to collect aerosol contained in an air stream, and a duct configured to direct the aerosol to the condenser. The source electrode and the sink electrode may create an electrical field within the duct.

One or more of the following features can be included in any feasible combination. For example, the source electrode may include a source mesh, and the source mesh may include a first network of wires. For example, the source mesh may include a wire diameter of between 0.5 mm and 5 mm, and a characteristic dimension of an opening of the source mesh may be between 1 mm and 15 mm. The source mesh may include stainless steel, nickel, conductive polymer, or conductive silicone. The source mesh may include a plurality of layers each of which including a network of wires. The sink electrode may include a condensing mesh, the condensing mesh including a second network of wires. The sink electrode may condense the aerosol on the condensing mesh to form droplets, which precipitate by at least gravity.

The condenser may include an inlet configured to receive an air stream having a first relative humidity, an outlet configured to discharge an air stream having a second relative humidity, which is lower than the first relative humidity, and a reservoir configured to collect the droplets. The condensing mesh may include a wire diameter of between 0.5 mm and 5 mm, and a characteristic dimension of an opening of the condensing mesh may be between 1 mm and 15 mm. The condensing mesh may include stainless steel, nickel, conductive polymer, or conductive silicone. The condensing mesh may include a plurality of layers each of which includes a network of wires.

The electrical source may include a direct current (DC) power supply that generates the electrical voltage between 20 V and 10 kV. The sink electrode may be electrically grounded or be connected to an opposite electrical source that imparts an opposite electrical charge to the sink electrode.

The system may include a blower configured to drive an air stream that contains the aerosol through the source electrode and to the condenser along the duct. A cross-sectional area of the duct may increase along a flow direction of the air stream, and the sink electrode may be arranged in a convex shape that protrudes toward the flow direction of the air stream.

In another aspect, a method of condensing aerosol may include applying an electrical field between a source electrode and a sink electrode, the source electrode electrically connected to an electrical source that applies an electrical voltage to the source electrode, condensing aerosol contained in an air stream to droplets at the sink electrode, and collecting the condensed droplets. The method may also include blowing the air stream along a duct with a blower. The electrical field may be applied with a direct current (DC) power supply that generates the electrical voltage between 20 V and 10 kV. The sink electrode may be electrically grounded or be connected to an opposite electrical source that imparts an opposite electrical charge to the sink electrode.

In yet another aspect, an aerosol condensing system may include a source electrode electrically connected to an electrical source that applies an electrical voltage to the source electrode, and a condenser including a sink electrode to collect aerosol contained in an air stream. The source electrode and the sink electrode may create an electrical field, and the sink electrode may condense the aerosol on a condenser mesh to form droplets, which precipitate by at least gravity.

One or more of the following features can be included in any feasible combination. For example, the condenser may include an inlet configured to receive an air stream having a first relative humidity, an outlet configured to discharge an air stream having a second relative humidity which is lower than the first relative humidity, and a reservoir configured to collect the droplets. The system may include an electrostatic precipitator (ESP) disposed downstream of the condenser to capture solid particles. The system may include a wind turbine disposed at an upstream of the condenser or at a downstream of the condenser. The wind turbine may be configured to generate an electrical power, which may be supplied to the electrical source. The system may include a duct configured to direct the aerosol to the condenser, and the duct may include a converging portion, a diverging portion, or both.

In yet another aspect, a method of controlling humidity may include applying an electrical field between a source electrode and a sink electrode, the source electrode electrically connected to an electrical source that applies an electrical voltage to the source electrode, and controlling a humidity of the air stream by the sink electrode. The controlling the humidity of the air stream may include supplying water at the sink electrode when the humidity of the air stream is less than a preset target humidity. The water may be supplied from a water reservoir. The controlling the humidity of the air stream may also include condensing water at the sink electrode and collecting the condensed water when the humidity of the air stream is greater than a preset target humidity. The condensed water may be collected in a water reservoir. The controlling the humidity of the air stream may include adjusting the electrical voltage applied to the source electrode. The controlling the humidity of the air stream may also include measuring the humidity of the air stream with a humidity sensor, generating a control signal based on the measured humidity of the air stream with a proportional-integral-derivative (PID) controller, and outputting the control signal to adjust the electrical voltage applied to the source electrode.

In yet another aspect, a non-transitory computer readable medium may contain program instructions executed by a processor or controller, and the computer readable medium may include a memory configured to store program instructions and a processor configured to execute the program instructions. The program instructions when executed may receive a humidity value of an air stream from a humidity sensor, generate a control signal based on the received humidity value of the air stream, and cause to output a voltage that corresponds to the control signal to a source electrode of a humidity control system.

In yet another aspect, a method of monitoring and controlling a cooling tower may include measuring a first temperature of a cooled stream discharging from a cooling tower, measuring a second temperature of a hot stream entering the cooling tower, calculating a temperature difference between the first temperature and the second temperature, and adjusting a first flow rate of the cooled stream to allow the temperature difference to correspond to a predetermined target temperature difference between the first temperature and the second temperature.

One or more of the following features can be included in any feasible combination. For example, the method may include adding a makeup stream into the cooled stream. A mixing ratio of the makeup stream and the cooled stream may be determined based on the temperature difference between the first temperature and the second temperature. The method may include adjusting a rotational speed of a fan to adjust a flow rate of cooling air. The method may include measuring an acidity of the cooled stream, and adjusting the acidity by adjusting the mixing ratio of the makeup stream.

In yet another aspect, a system for monitoring and controlling a cooling tower may include a first temperature sensor to measure a first temperature of a cooled stream discharged from a cooling tower, a second temperature sensor to measure a second temperature of a hot stream entering the cooling tower, a first valve to adjust a first flow rate of the cooled stream, a second valve to adjust a second flow rate of the hot stream, a memory configured to store program instructions, and a processor configured to execute the program instructions. The program instructions when executed may configure the processor to collect data from the first temperature sensor and the second temperature sensor, and adjust the first valve or the second valve to allow a temperature difference between the first temperature and the second temperature to correspond to a predetermined target temperature difference.

One or more of the following features can be included in any feasible combination. For example, the processor may be configured to adjust a fan speed. The processor may be configured to adjust a mixing ratio of a makeup stream and the cooled stream to allow the temperature difference between the first temperature and the second temperature to correspond to the target temperature difference. The processor may be configured to adjust the mixing ratio of the makeup stream and the cooled stream to allow the acidity of the cooled stream to correspond to a predetermined target acidity. The system may also include an acidity sensor to measure an acidity of the cooled stream.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5A is a flow chart for a method for condensing aerosol according to an exemplary embodiment of the present disclosure;

FIG. 5B is a flow chart for a method for condensing aerosol according to another exemplary embodiment of the present disclosure;

Figure 1:
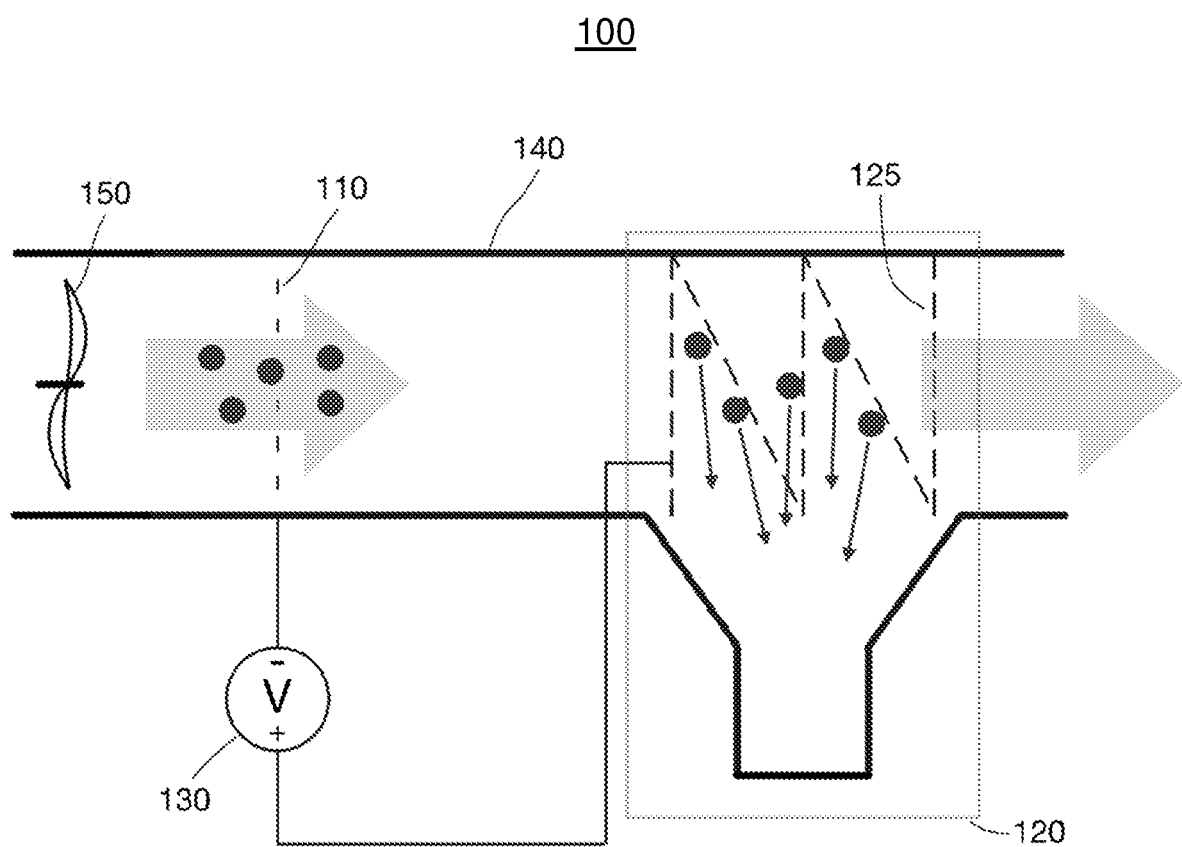
FIG. 1 is a schematic view of a system for condensing vapor according to an exemplary embodiment of the present disclosure.
Figure 2:
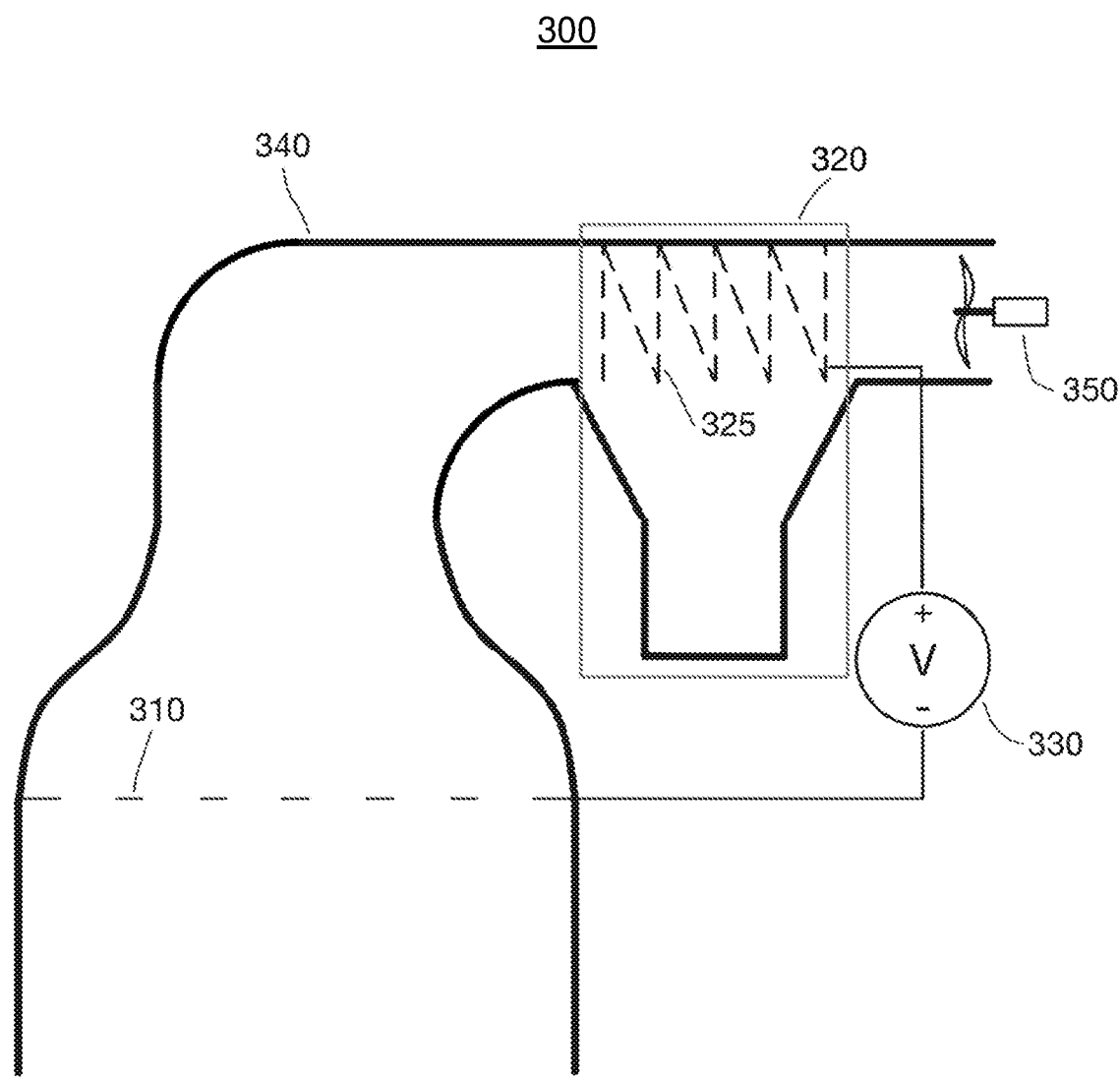
FIG. 2 is a schematic view of a system for condensing aerosol in a cooling tower according to an exemplary embodiment of the present disclosure.

FIG. 8A illustrates an arrangement of the source electrode and the sink electrode according to an exemplary embodiment of the present disclosure;

FIG. 8B illustrates an arrangement of the source electrode and the sink electrode according to another exemplary embodiment of the present disclosure;

FIG. 9A is a schematic view of a system for condensing aerosol in a cooling tower according to an exemplary embodiment of the present disclosure;

FIG. 9B is a schematic view of the duct with a converging-diverging portion and a wind turbine disposed within the converging-diverging portion according to an exemplary embodiment of the present disclosure;

FIG. 9C is a schematic view of the duct with a converging portion and a wind turbine disposed within the converging portion according to an exemplary embodiment of the present disclosure;

FIG. 9D is a schematic view of the duct with a diverging-converging portion and a wind turbine disposed within the diverging-converging portion according to an exemplary embodiment of the present disclosure;

FIG. 10 is a schematic view of a cooling tower monitoring system (CTMS) according to an exemplary embodiment of the present disclosure;

FIG. 11 lists elements of the CTMS according to an exemplary embodiment of the present disclosure; and FIG. 12 illustrates sensor and control elements of the CTMS according to an exemplary embodiment of the present disclosure.

DETAILED DESCRIPTION

The current subject matter can provide a safe and energy efficient technology to condense and collect ambient aerosols, for example, water droplets, by applying an electrical field between a source electrode and a sink electrode to drive the aerosols along the electrical field. By creating an electrical field and driving the aerosols, without ionizing the aerosols with a high voltage electrical source, the system can be implemented to be safer, have higher efficiency, and produce water with fewer impurities, as compared to some conventional approaches. Exemplary applications include a turbine cooling tower and combustion smoke stack. Existing infrastructures may be retro-fitted and integrated using the current subject matter.

Techniques of scavenging water droplets or vapor from ambient air can include collectors in the form of wire meshes, and the condensation relies on inertial collision of the water droplets or vapor onto the collector meshes for droplet capture. These techniques can be limited by aerodynamic drag forces since droplets may be required to collide with the wire meshes.

A problem associated with previous approaches to vapor condensing and collecting may be solved by utilizing electrical forces. The water vapor in the ambient air may be electrically charged and directed toward a collector by an imposed electric field. When the water vapor is electrically charged, it can be attracted to a collector that is charged with an opposite charge. Therefore, the charged water vapor can collide with surfaces of the collector meshes with an increased probability. Upon impact, droplets can stick to the mesh and grow as they coagulate with other incoming droplets. As they grow sufficiently large and heavy on the collector mesh, the droplets may precipitate due to gravity, and the precipitating droplets may be collected in a reservoir.

There may be a number of different means to scavenge ambient aerosols mainly containing water. In some conventional approaches, corona discharge may be used to introduce a space charge into the water vapor to impart a net charge to the incoming droplets. Corona discharge may be produced by using a sharp metallic needle that is connected to a high-voltage generator. Typically, voltages to produce stable corona discharge ranges from −10 kV to −24 kV.

However, using corona discharge to impart electrical charges to ambient water vapor may present problems. For example, corona discharge ionizes surrounding air, and can produce gases such as ozone ($O_3$) and nitric oxide (NO). Nitric oxide can be further oxidized to form nitrogen dioxide ($NO_2$) and subsequently nitric acid ($HNO_3$) through photochemical reactions. These gases and liquids are toxic, corrosive, and environmentally harmful. If the water vapor condensing system is made with the corona discharge system, what is collected at the collector is corrosive and toxic acid, and therefore, the collected liquid requires further treatment if it is desired to be used for useful purposes. In addition, the corona discharge system, when implemented for water vapor condensing system, may be dangerous due to the high voltage associated therewith, may waste large amount of energy, and/or may interfere neighboring electronic instruments due to the high voltage discharges. Moreover, the corona discharge system poses a concern for explosion when the system is surrounded by debris with high surface areas (e.g., dust particles) and/or loose articles.

In some implementations, an electric field may be applied within a predefined space to direct and collect the ambient aerosols. In a system using the electric field to scavenge ambient aerosols, the system may not require a high voltage generator, and thus, the surrounding air may not be ionized. Since the dielectric breakdown voltage of air is relatively high, at about 3 kV/mm, a substantial electric field may be applied within the predefined space to drive the aerosols to a particular location (e.g., a sink electrode) where the aerosol may be coagulated and collected. Consequently, toxic and corrosive gases and liquids are not produced. The system can be implemented to be safer than the corona discharge system, has better energy utilization efficiency, and moreover, produces water with fewer impurities to allow the collected water to be directly used (e.g., without further processing or purification). Since the system relies on the polar nature of water molecules, the system may discriminate polar aerosols (e.g., water) from non-polar aerosols (e.g., dust), and thereby producing condensed water with fewer impurities.

FIG. 1 is a schematic view of a system 100 for condensing vapor according to an exemplary embodiment of the present disclosure. Referring to FIG. 1, the system 100 for condensing vapor may include a source electrode 110, a condenser 120, and a duct 140.

Figure 3:
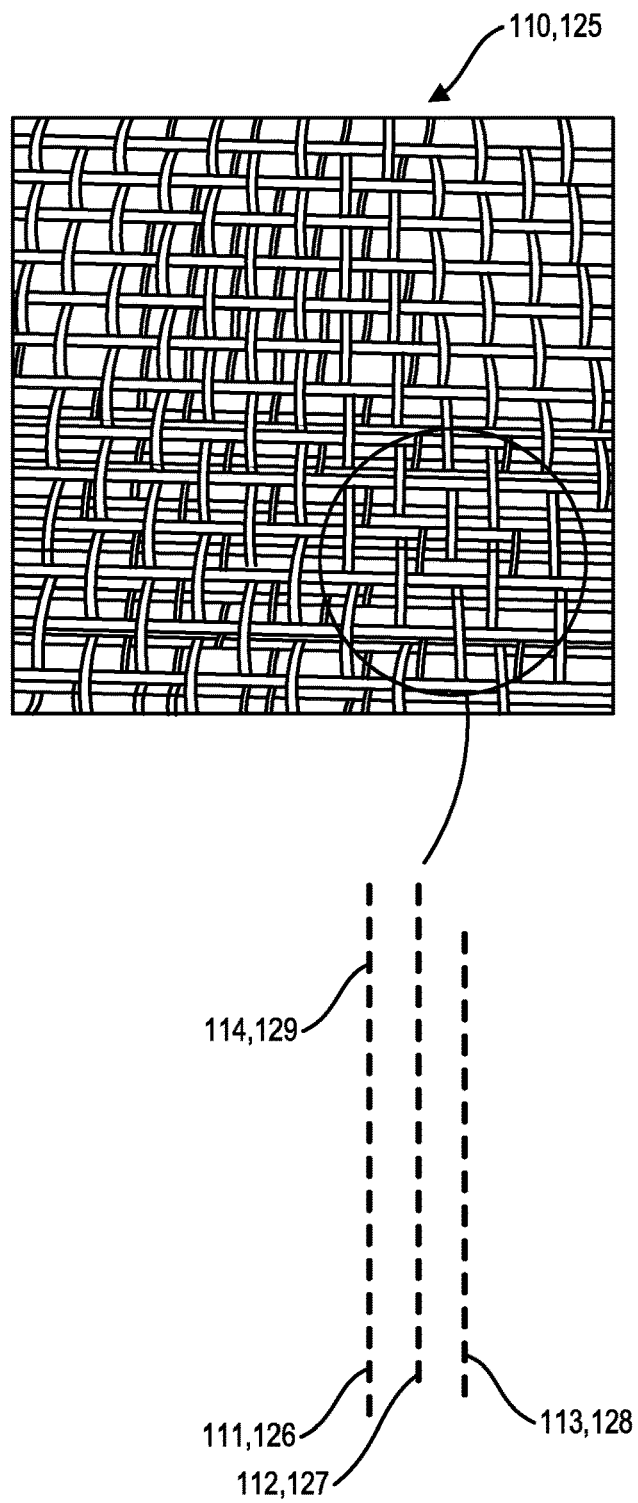
FIG. 3 illustrates a source mesh and a condensing mesh according to an exemplary embodiment of the present disclosure.

The source electrode 110 may be electrically connected to an electrical source 130 that may apply an electrical voltage to the source electrode 110. The source electrode 110 may apply an electric field within the duct 140 to drive the ambient aerosols that that contained in an incoming air stream. The source electrode 110 may include a source mesh. An example of the source mesh is shown in FIG. 3. Referring to FIG. 3, the source mesh may include a plurality of layers 111, 112 and 113.

Each of the plurality of layers 111, 112 and 113 may have a plurality of openings. Each opening 114 formed in each of the plurality of layers 111, 112 and 113 may have a characteristic dimension between 1 mm to 15 mm, depending on applications, flow rate requirements, applied voltages, and the like. In some implementations, the characteristic dimension of each opening 114 may be the same among the plurality of the openings or may be different. Moreover, the opening 114 of the plurality of layers 111, 112 and 113 may be aligned with each other or may be staggered. The source mesh of the source electrode 110 may be made of a conductive material. Examples of the materials that can be used for the source mesh include stainless steel, nickel, conductive polymers, and conductive silicone. Further, the source mesh may be made of and/or coated with a hydrophobic material to prevent the uptake of water vapor. The source electrode 110 may also be implemented with a liquid or a gas depending on the application and the use environment.

The source mesh may include a network of wires. The network of wires may include a plurality of interlaced or interwoven wires. Each layer of the source mesh may include a plurality of interlaced or interwoven wires that run in a predetermined pattern at substantially regular intervals. In this exemplary implementation of the source mesh, the characteristic dimension of the opening 114 may be defined by the regular intervals of the pattern. Alternatively or additionally, the source mesh may be formed to include randomly woven wires. In this exemplary implementation, the characteristic dimension of the opening 114 may be defined by a maximum diameter of particles that can be passed without being filtered by more than a certain threshold transmission efficiency. For example, the characteristic dimension of the opening 114 may be said to be 1 mm if more than a certain percentage of the 1 mm particles can be transmitted through the source mesh. The threshold transmission efficiency may be set to 90%, but the present disclosure is not limited thereto. The wires that form the source mesh may have a diameter between 0.5 mm and 5 mm depending on applications, flow rate requirements, applied voltages, and the like. Although an example has been described for the wire mesh that includes horizontal wires and vertical wires, the present disclosure is not limited thereto. The source mesh may consist merely of horizontal wires or vertical wires.

Figure 4:
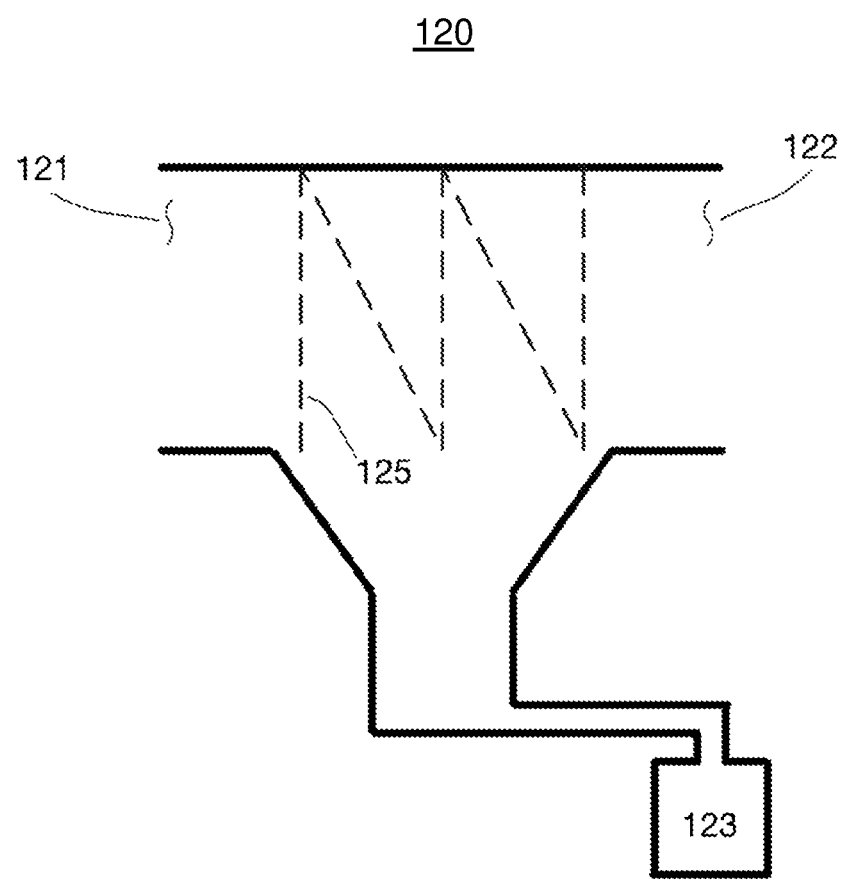
FIG. 4 is a schematic view of a condenser used in a system for condensing aerosol according to an exemplary embodiment of the present disclosure.

The water vapor may be attracted to and collected at the condenser 120. As shown in FIG. 4, the condenser 120 may include an inlet 121, an outlet 122, and a reservoir 123. In operation, the inlet 121 may receive an incoming air stream having a first relative humidity value. The outlet 122 may discharge an outgoing air stream having a second relative humidity value. To achieve a net condensing of water vapor, the second relative humidity may be lower than the first relative humidity. The condensed water at the condenser 120 may be collected in the reservoir 123. As used herein, relative humidity value refers to a ratio of the partial pressure of water vapor to the saturation vapor pressure of water at a given temperature.

The condenser 120 may include a sink electrode 125. The sink electrode 125 may be electrically grounded and/or may be connected to an electrical source 130 that imparts an electrical charge that is opposite to the electrical charge imparted to the source electrode 110. Although FIG. 1 shows an exemplary embodiment in which a common electrical source 130 supplies electrical charges to both the source electrode 110 and the sink electrode 125, the present disclosure is not limited thereto. The source electrode 110 and the sink electrode 125 may be connected to separate electrical sources.

The sink electrode 125 may include a condensing mesh. As shown in FIG. 3, the condensing mesh may include a plurality of layers 126, 127 and 128 to provide a sufficient surface area to allow the water vapor to stick to the surface of the condensing mesh and to condense on the surface of the condensing mesh. In operation, the condensed water vapor may coagulate with other condensed water vapor on the surface of the condensing mesh to form water droplets, and the water droplets may coagulate further with each other until they grow to be large and heavy. When they become sufficiently large and heavy, the water droplets may precipitate via gravity. The reservoir 123 may be disposed under the sink electrode 125 to collect the precipitating water droplets.

In the condensing mesh, as shown in FIG. 3, each of the plurality of layers 126, 127 and 128 may have a plurality of openings. Each opening 129 may have a characteristic dimension between 1 mm to 15 mm, depending on applications, flow rate requirements, neutralization efficiency, and the like. The characteristic dimension of each opening 129 may be the same among the plurality of openings or may be different. The opening 129 of the plurality of layers 126, 127 and 128 may be aligned with each other or may be staggered to increase a chance for the aerosol to collide with the surface of the source mesh. The condensing mesh of the sink electrode 125 may be made of a conductive material. Examples of the materials to be used in the condensing mesh can include stainless steel, nickel, conductive polymers, and conductive silicone. Further, the condensing mesh may be made of and/or coated with a hydrophilic material to facilitate the condensation of water vapor on the mesh surface more easily. The sink electrode 125 may also be implemented with a liquid or a gas depending on the application and the use environment.

Similar to the source mesh, the condensing mesh may include a network of wires. The network of wires may include a plurality of interlaced or interwoven wires. Each layer of the condensing mesh may include a plurality of interlaced or interwoven wires that run in a predetermined pattern at substantially regular intervals. In this exemplary implementation of the condensing mesh, the characteristic dimension of the opening 129 may be defined by the regular intervals of the pattern. Alternatively, the condensing mesh may be formed as randomly woven wires. In this exemplary implementation, the characteristic dimension of the opening 129 may be defined by a maximum diameter of particles that can be passed without being filtered by more than a certain threshold transmission efficiency. For example, the characteristic dimension of the opening 129 may be said to be 1 mm if more than a certain percentage of the 1 mm particles can be transmitted through the condensing mesh. The threshold transmission efficiency may be 90%, but the present disclosure is not limited thereto. The wires that form the condensing mesh may have a diameter between 0.5 mm and 5 mm depending on applications, flow rate requirements, applied voltages, and the like. Although an example has been described for the wire mesh that includes horizontal wires and vertical wires, the present disclosure is not limited thereto. The condensing mesh may consist merely of horizontal wires or vertical wires.

It may be generally desirable that the source mesh and the condensing mesh have minimal characteristic dimensions to provide a more finely distributed electrical field. However, a pressure drop across the meshes may require to be within a particular value to ensure sufficient air flow through the system. Accordingly, the pressure drop requirement may dictate the lower limit for the characteristic dimensions of the meshes.

As described above, the electrical source 130 may be electrically connected to the source electrode 110, the sink electrode 125, or both. In some embodiments, the electrical source 130 may be implemented as a direct current (DC) power supply with a voltage rating between 20 V and 10 kV. For example, the applied voltage may be 7 kV. The electrical power or voltage may be determined based on the size of the system, a process capacity of the system, and the like. In some embodiments, the electrical source 130 may be implemented as a direct current (DC) power supply with a voltage rating between 20 V and 9 kV; 20 V and 8 kV; 20 V and 7 kV; 20 V and 6 kV; 20 V and 5 kV; 20 V and 4 kV; 20 V and 3 kV; 20 V and 2 kV; 20 V and 1 kV; 1 kV and 9 kV; 2 kV and 8 kV; 3 kV and 7 kV; or 4 kV and 6 kV.

As shown in FIG. 1, the duct 140 may guide and direct the water vapor from the source electrode 110 side toward the sink electrode 125 side. In some embodiments, it may be undesirable if the charged vapor is attracted to surfaces of the duct 140. To address this issue, the surface of the duct 140 may be made to be electrically conducting. If the surface of the duct 140 is electrically conducting, several particles that are charged may be initially taken up by the surface of the duct 140, and may charge the entire surface of the duct 140 with the same charge as the water vapor. Once the surface of the duct 140 is charged with the same charge as the water vapor, other charged vapor that subsequently arrive may be repelled from the surface of the duct 140, thereby allowing the charged vapor to be transmitted through the duct 140 with a high transmission efficiency and without being lost to the surface of the duct 140.

Therefore, the duct 140 may include an electrically conducting material. In some implementations, the duct 140 may include (e.g., made of) an electrically insulating material such as a plastic, and the inside surface thereof may be coated or painted with an electrically conducting material. Depending on applications, the duct 140 may include a long flow path to dispose the source electrode 110 and the condenser 120 at separate locations. In such cases, the duct 140 may include flexible plastic or polymer materials and the inside surface thereof may be coated with an electrically conducting material.

On the other hand, in some applications, it may be desirable that the charged water vapor sticks to the surface of the duct 140 to increase overall vapor removal efficiency. In such cases, the duct 140 may include an electrically insulating material. In some implementations, the duct 140 may include (e.g., made of) an electrically conducting material and the inside surface thereof may be coated or painted with an electrically insulating material such as a plastic or a ceramic material. In some implementation, the duct 140 may be installed at an inclination with a predetermined angle going from a proximal end toward a distal end to allow the water droplets that have been condensed on the surface of the duct 140 to flow and be collected either at the proximal end or the distal end.

When the duct 140 includes an electrically conducting material, a particular portion near the source electrode 110 and the sink electrode 125 may include an electrically insulating material to prevent electric discharge between the electrodes and the duct 140. Further, the duct 140 may also include one or more flow straighteners.

The air stream may be forced (e.g., driven) through the duct 140 from the source electrode 110 side toward the sink electrode 125 side. To blow and guide the air stream through the duct 140, the system 100 may include a blower 150. The blower 150 may be implemented as an electric fan, an eductor pump, or the like. The system 100 may further include aerosol monitoring equipment (not shown), for example, an electrometer-based particle counter, a condensation particle counter (CPC), a scanning mobility particle sizer (SMPS), or the like. The system 100 may also monitor an electrical current that flows between the source electrode 110 and the sink electrode 125.

FIGS. 5A and 5B show process flow charts for a method for condensing aerosols according to exemplary embodiments of the present disclosure. Referring to FIG. 5A, the method may include steps of applying electrical field S110, condensing the aerosol S120, and collecting the condensed droplets S130. The step of applying electrical field S110 may be performed by a source electrode 110, which may be electrically connected to an electrical source 130 that may supply an electrical voltage to the source electrode 110. The step of condensing the aerosol S120 may be performed by a sink electrode 125, which may be either electrically grounded or connected to an electrical source 130 that imparts an electrical charge that is opposite to the electrical charge imparted to the source electrode. The source electrode 110 and the sink electrode 125 may be connected to a common electrical source 130 or may be connected to separate electrical sources. The step of collecting the condensed droplets S130 may be performed by a condenser 120 and a reservoir 123.

Referring to FIG. 5B, the method may include a step of blowing S205 by a blower 150 in addition to the steps of applying electrical field S210, condensing the aerosol S220, and collecting the condensed droplets S230. In some embodiments, the step of applying electrical field S110 and S210 may be performed with direct current (DC) power supply that generates a voltage rating between 20 V and 10 kV.

FIG. 2 is a schematic view of a system for condensing water in a cooling tower according to an exemplary embodiment of the present disclosure. The cooling tower to which the system 300 can be applied may include a cooling tower of a steam turbine exhaust. Referring to FIG. 2, the system 300 may include a source electrode 310 and a condenser 320 disposed within a duct 340.

The source electrode 310 may be electrically connected to an electrical source 330 that may supply an electrical voltage to the source electrode 310. As such, the source electrode 310 may create an electrical field within the duct 340. The source electrode 310 may include a source mesh.

The water vapor may be attracted to and collected at the condenser 320. The condenser 320 may be implemented substantially similar to the exemplary implementation shown in FIG. 4. For example, the condenser 320 may include a sink electrode 325. The sink electrode 325 may be electrically grounded, and/or may be connected to an electrical source 330 that imparts an electrical charge that is opposite to the electrical charge imparted to the source electrode 310. The source electrode 310 and the sink electrode 325 may be connected to a common electrical source 330 or may be connected to separate electrical sources. The sink electrode 325 may further include a condensing mesh.

The condensing mesh may allow the water vapor to stick to the surface thereof and to condense on the surface of the condensing mesh. In operation, the condensed water vapor may coagulate with other condensed water vapor on the surface of the condensing mesh to form water droplets. The water droplets may coagulate further with each other until they grow to be large and heavy. When they become sufficiently large and heavy, the water droplets may precipitate due to gravity. A reservoir may be disposed under the sink electrode 325 to collect the water droplets that precipitate.

As shown in FIG. 2, the duct 340 may guide and direct the water vapor from the source electrode 310 side toward the sink electrode 325 side. Generally, the steam turbine cooling towers already include an exhaust stream that is either forced or naturally drafted. Thus, the system 300 may scavenge and utilize the remaining enthalpy of the exhaust stream, e.g., to generate electric power. An example to extract electric power from the steam turbine exhaust is to include a wind turbine 350 at a downstream of the condenser 320. The electric power scavenged from the exhaust stream may be directly supplied to the electrical source 330 for operation of the system 300, or alternatively, may be stored in a battery (not shown) to be used later. Generating electricity in situ by scavenging waste enthalpy in the cooling tower exhaust and using the electricity on-site may increase the overall efficiency of the system 300. In an exemplary embodiment of the present disclosure, the wind turbine 350 may be disposed at the downstream of the condenser 320, but the present disclosure is not limited to such a configuration. The wind turbine 350 may also be disposed at an upstream of the condenser 320.

FIG. 9A illustrates an exemplary implementation in which the wind turbine is disposed at an upstream of the condenser. Referring to FIGS. 9A and 9B, the exhaust stream from a cooling tower 910 may be guided by a duct 920 toward a condenser 930. The duct 920 may include a converging-diverging portion 925. A wind turbine 940 may be disposed within the duct 920 at the converging-diverging portion 925. Remaining enthalpy of the exhaust stream may operate the wind turbine 940 to generate electric power, and the generated electric power may be used to operate the condenser 930. The converging-diverging portion may accelerate the exhaust flow to facilitate more effective scavenging of kinetic energy in the exhaust stream by the wind turbine 940. Moreover, extracting energy from the exhaust stream may decrease the temperature of the exhaust stream, and thereby allow the water vapor in the exhaust stream to condense more easily in the condenser 930.

Figure 9A:
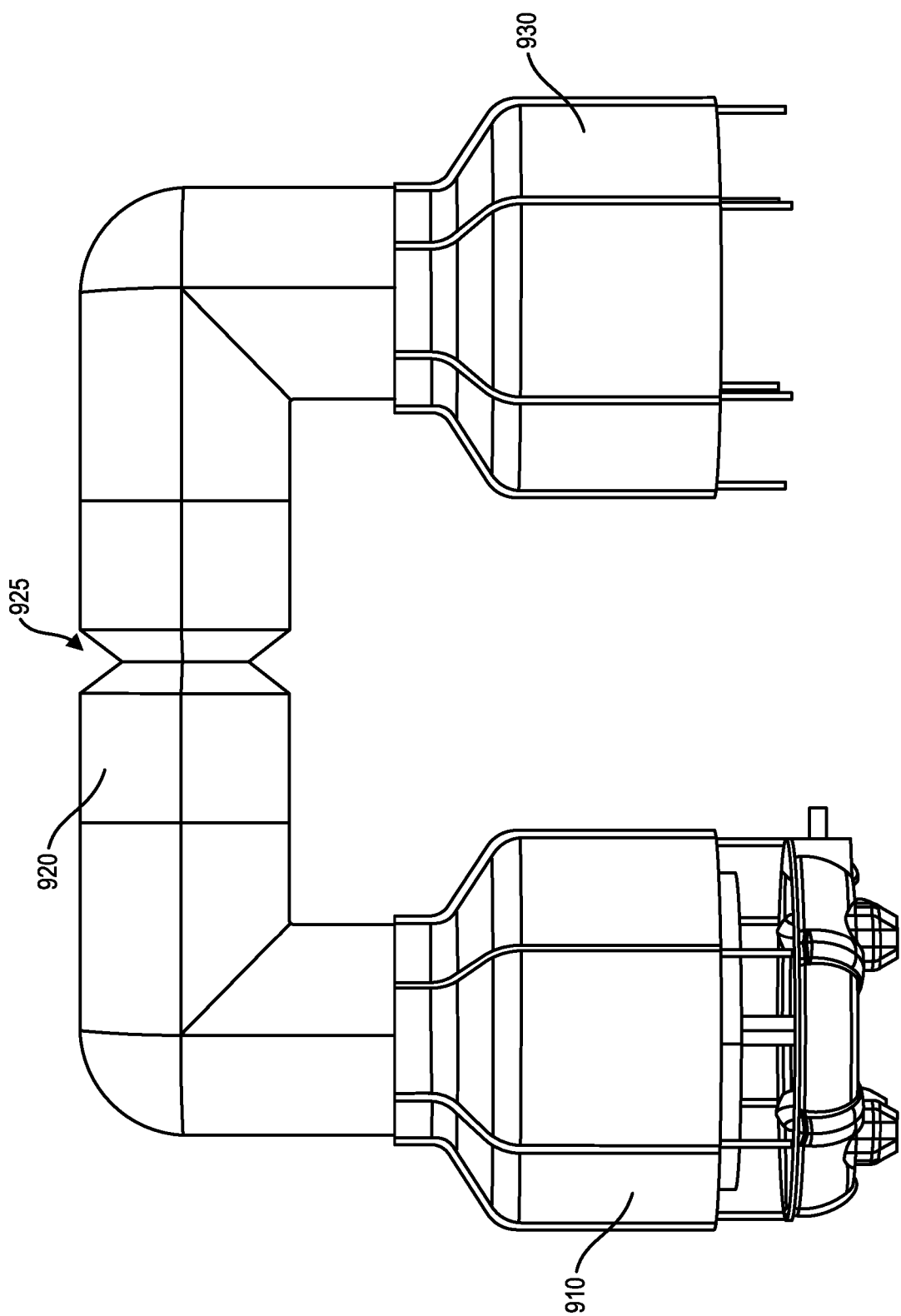
Figure 9B:
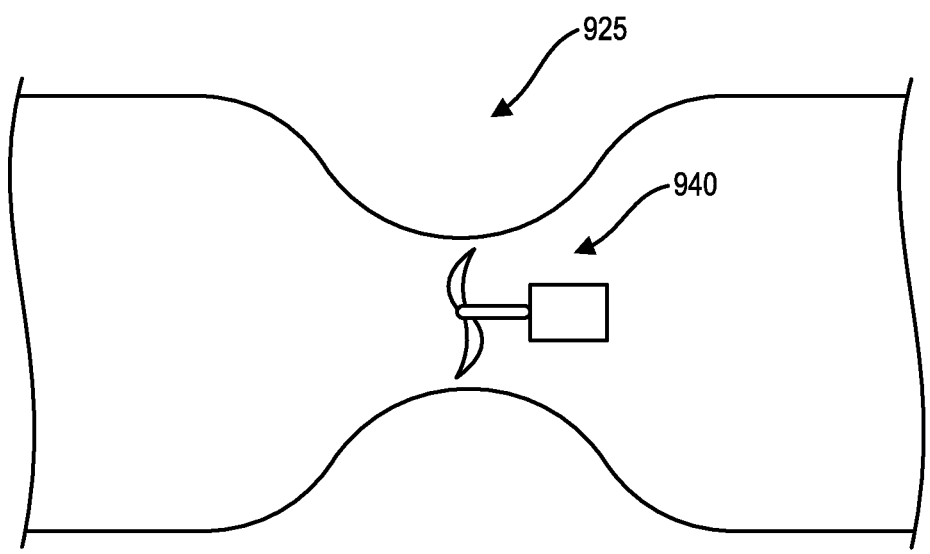
Figure 9C:
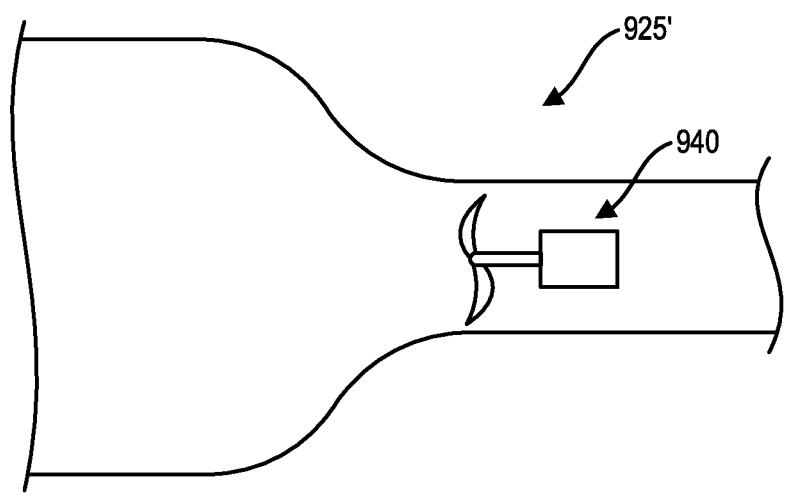

In some implementations, as shown in FIG. 9C, the duct 920 may include a converging portion 925' without a diverging portion. For example, a diameter of the cooling tower may be about 30 ft, and the duct may decrease the diameter gradually to about 5 ft prior to the wind turbine and the condenser. This configuration may accelerate the exhaust flow to allow the wind turbine 940 to generate greater power output and/or to allow the condenser system to be made smaller in overall size. Since the maximum theoretical power output from a wind turbine is generally proportional to the area of the blade disk and the cube of the wind velocity, the converging portion 925' or converging-diverging portion 925 may increase the power output of the wind turbine 940 by increasing the wind velocity.

Figure 9D:
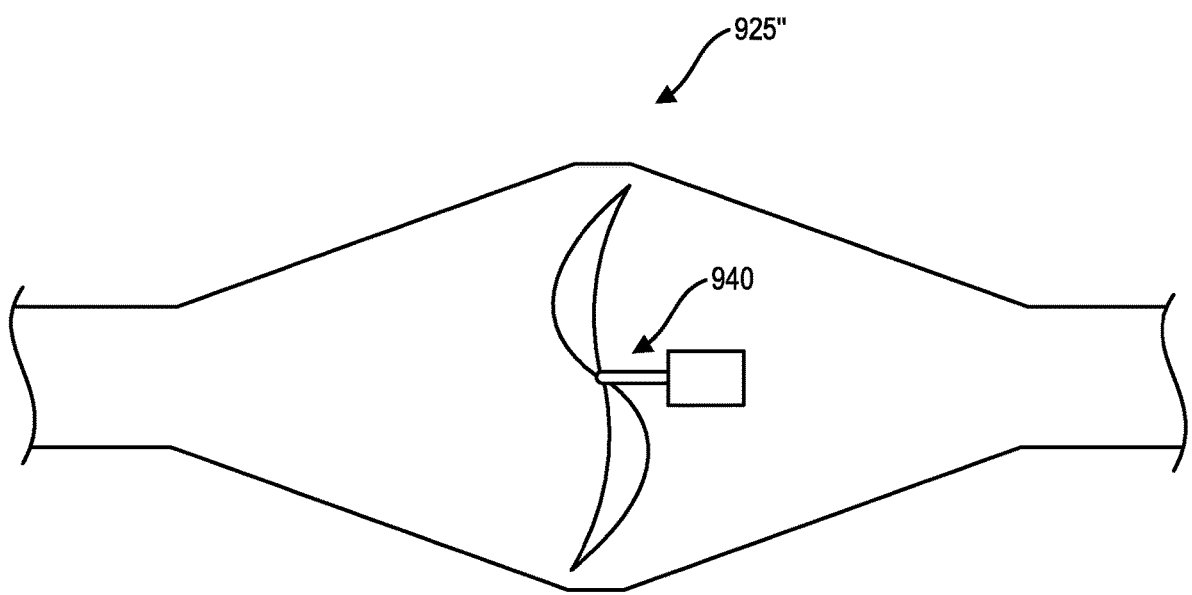

In some implementations, the duct 920 may include a diverging-converging portion 925" as shown in FIG. 9D. In this configuration, the exhaust flow may decelerate at the diverging-converging portion 925", and a wind turbine 940 with a greater diameter may be installed within the duct. The wind turbine 940 with the greater diameter may be rotated at a slower speed, which may reduce noise, frictional losses, system wear, or the like. In some implementations, a plurality of wind turbines may be disposed within the duct.

The system may also be applied to combustion exhaust. The combustion exhaust may include combustion-based power stations such as, for example, coal-fired power plant and natural gas power plant, and internal combustion engines such as, for example, diesel engine and gasoline engine. In the typical combustion exhaust, non-volatile particles (e.g., solid-phase soot particles) and condensable gases (e.g., water vapor) exist as combustion products. To remove both non-volatile and volatile aerosols with high efficiencies, the system may be disposed upstream of an electrostatic precipitator (ESP) to scavenge water before the exhaust stream enters the ESP. Removing water and other condensable matter from the combustion exhaust prior to the ESP may protect the ESP from corrosion due to water or other acidic liquids. In the combustion exhaust implementation, the system may also be disposed upstream of a filter such as, for example, a high efficiency particular air (HEPA) filter, or a cyclone-type particle remover. Further, the system may be implemented with a heat exchanger disposed upstream of the system to recycle waste heat from the combustion exhaust.

Figure 6:
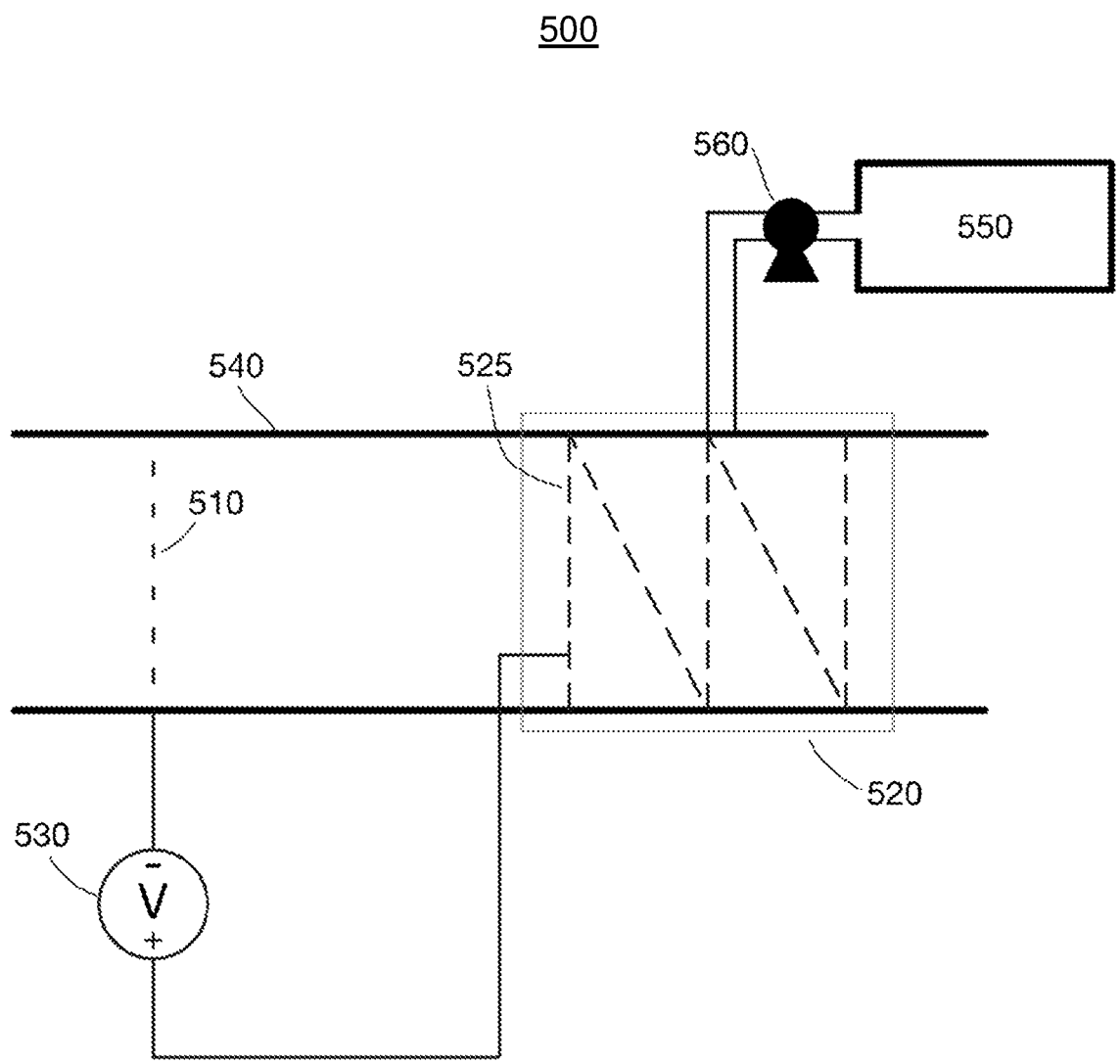
FIG. 6 is a schematic view of a system for humidity control according to an exemplary embodiment of the present disclosure.

Another aspect of the present disclosure provides a system for humidity control. FIG. 6 illustrates a system for humidity control according to an exemplary embodiment of the present disclosure. Referring to FIG. 6, the system 500 may include a source electrode 510 and a humidity controller 520 disposed within a duct 540. The source electrode 510 may be electrically connected to an electrical source 530 that may apply an electrical voltage to the source electrode 510. The source electrode 510 may create an electrical field within the duct 540. The source electrode 510 may further include a source mesh.

The water vapor may be attracted to the humidity controller 520 due to the electrical field. The humidity controller 520 may include a sink electrode 525, and the sink electrode 525 may be electrically grounded, and/or may be connected to an electrical source 530 that imparts an electrical charge that is opposite to the electrical charge imparted to the source electrode 510. The source electrode 510 and the sink electrode 525 may be connected to a common electrical source 530 or may be connected to separate electrical sources. The sink electrode 525 may include a humidifying mesh.

The humidifying mesh may be dampened with water. In operation, the water vapor may be attracted to the humidifying mesh of the sink electrode 525. On the surfaces of the humidifying mesh, liquid water supplied to the humidifying mesh may be transferred to the attracted vapor and leave the surfaces of the humidifying mesh. Through this process, the relative humidity of the air stream that passes through the system 500 may be increased. The system 500 may include a water reservoir 550 to supply liquid water to the humidity controller 520. In some implementations, the liquid water may be supplied from the water reservoir 550 to the humidity controller 520 via gravity. To supply the liquid water by gravity, the water reservoir 550 may be disposed at a position higher than the humidity controller 520. In some implementations, the liquid water may be supplied from the water reservoir 550 to the humidity controller 520 by a pump 560.

Figure 7:
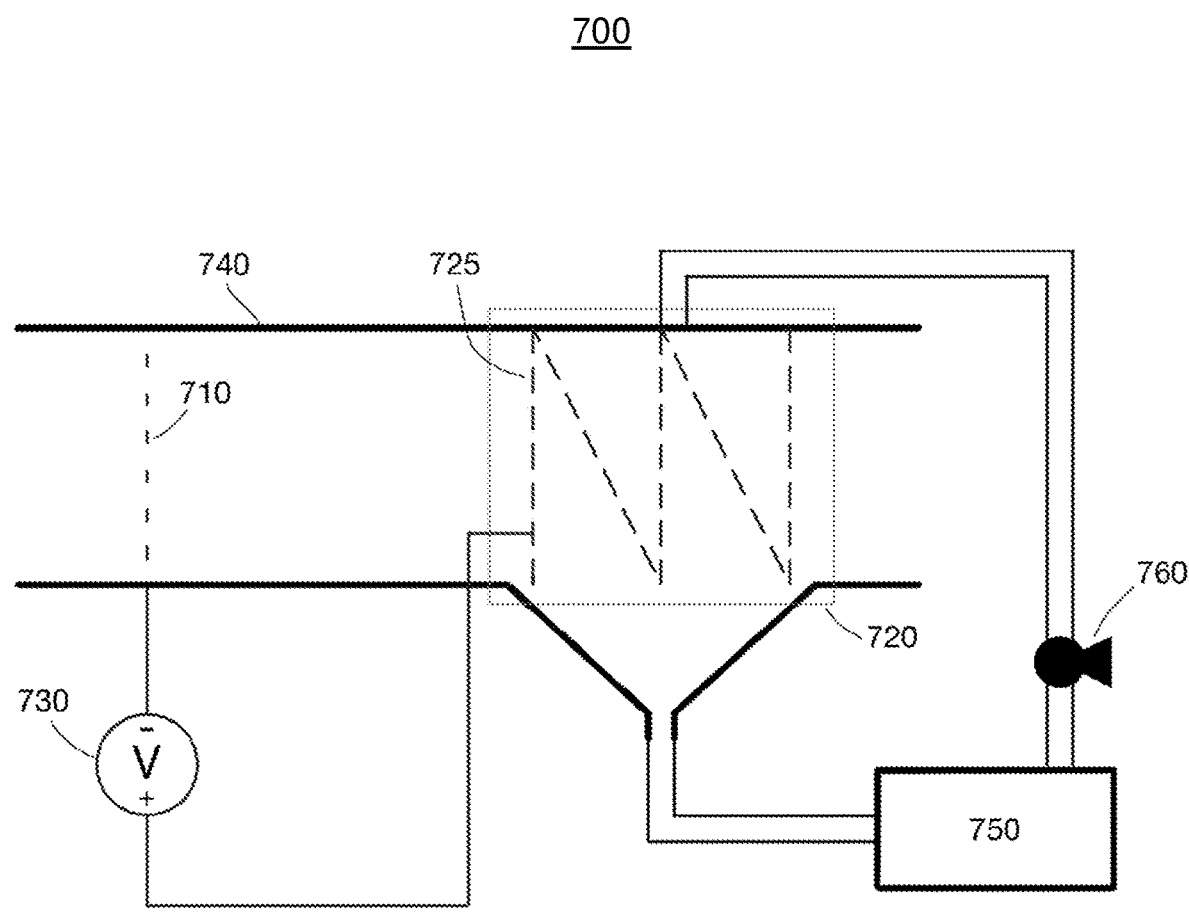
FIG. 7 is a schematic view of a system for humidity control according to another exemplary embodiment of the present disclosure.

FIG. 7 illustrates a system for humidity control according to another exemplary embodiment of the present disclosure. Referring to FIG. 7, the system 700 may include a source electrode 710 and a humidity controller 720 disposed within a duct 740. The system 700 for humidity control may be implemented in various environments where a constant humidity is required. The source electrode 710 may be electrically connected to an electrical source 730 that may apply an electrical voltage to the source electrode 710. As such, the source electrode 710 may create an electrical field within the duct 740. The source electrode 710 may further include a source mesh.

The water vapor may be attracted to the humidity controller 720 due to the electrical field. The humidity controller 720 may further include a sink electrode 725. The sink electrode 725 may be electrically grounded, and/or may be connected to an electrical source 730 that imparts an electrical charge that is opposite to the electrical charge imparted to the source electrode 710. The source electrode 710 and the sink electrode 725 may be connected to a common electrical source 730 or may be connected to separate electrical sources. The sink electrode 725 may further include a humidity control mesh.

In operation, the water vapor may be attracted to the humidity control mesh of the sink electrode 725. On the surfaces of the humidity control mesh, liquid water that is present on the humidity control mesh may be transferred to the attracted vapor and leave the surfaces of the humidity control mesh. Alternatively, the attracted water vapor may stick to the surfaces of the humidity control mesh. When there is more water leaving the surfaces of the humidity control mesh than sticking to the surfaces of the humidity control mesh, the relative humidity of the air stream after passing through the system 700 may be increased. Conversely, when there is more water sticking to the surfaces of the humidity control mesh than leaving the surfaces of the humidity control mesh, the relatively humidity of the air stream may be decreased. Through this process, the relatively humidity of the air stream may be controlled to a particular level.

The system 700 may be operated to maintain the relative humidity of the air stream that passes through the system 700 at a preset target humidity. The preset target humidity may be adjusted by adjusting a voltage applied. The system 700 may include a water reservoir 750 to store condensed water from the humidity control mesh and/or to supply liquid water to the humidity controller 720. The liquid water may be supplied from the water reservoir 750 to the humidity controller 720 by a pump 760. To control the humidity more precisely, the system 700 may further include a feedback control system including a humidity sensor, a temperature sensor, a proportional-integral-derivative (PID) controller for generating and outputting a control signal to the voltage of the electrical source 730.

Figure 8A:
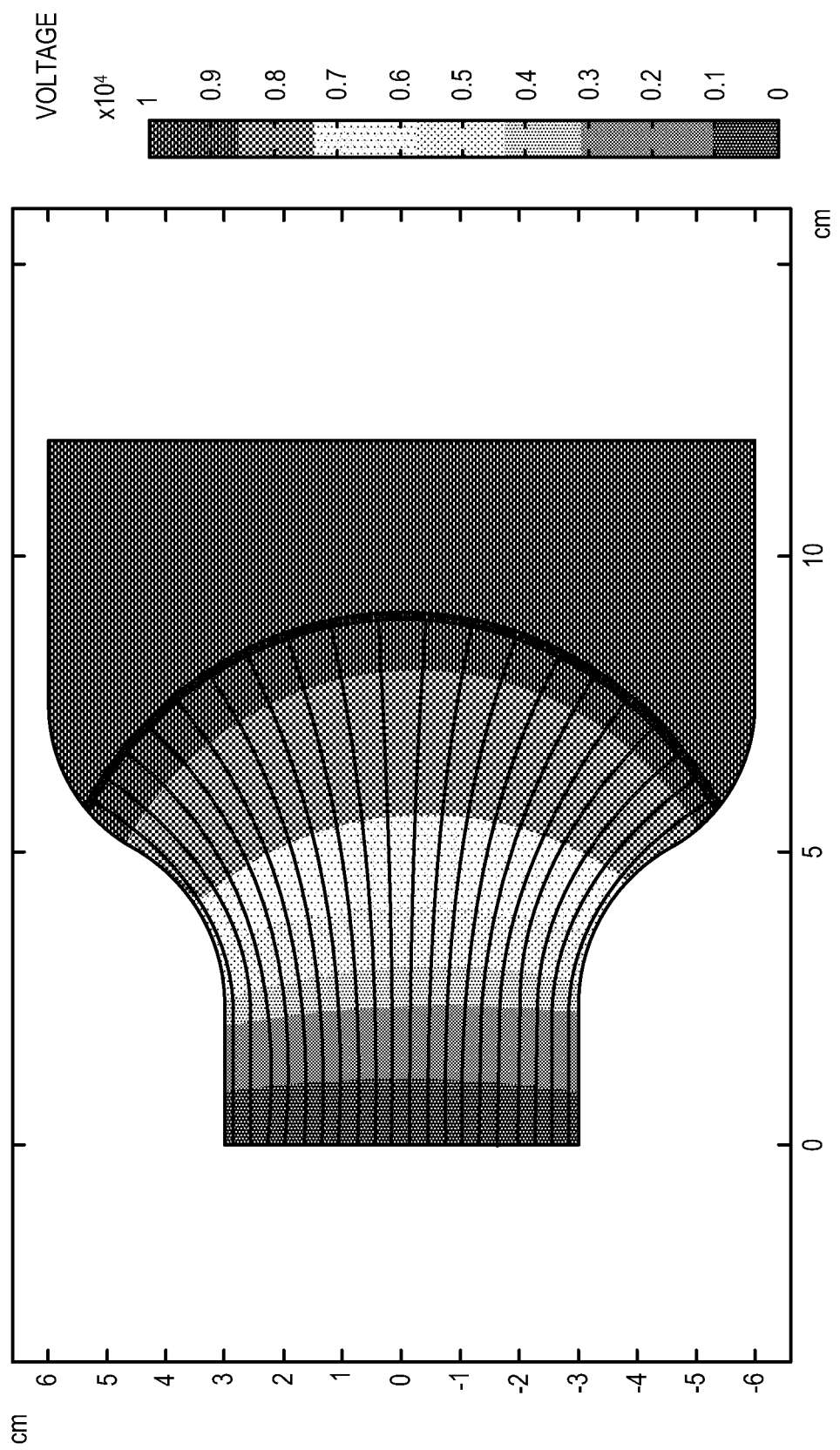
Figure 8B:
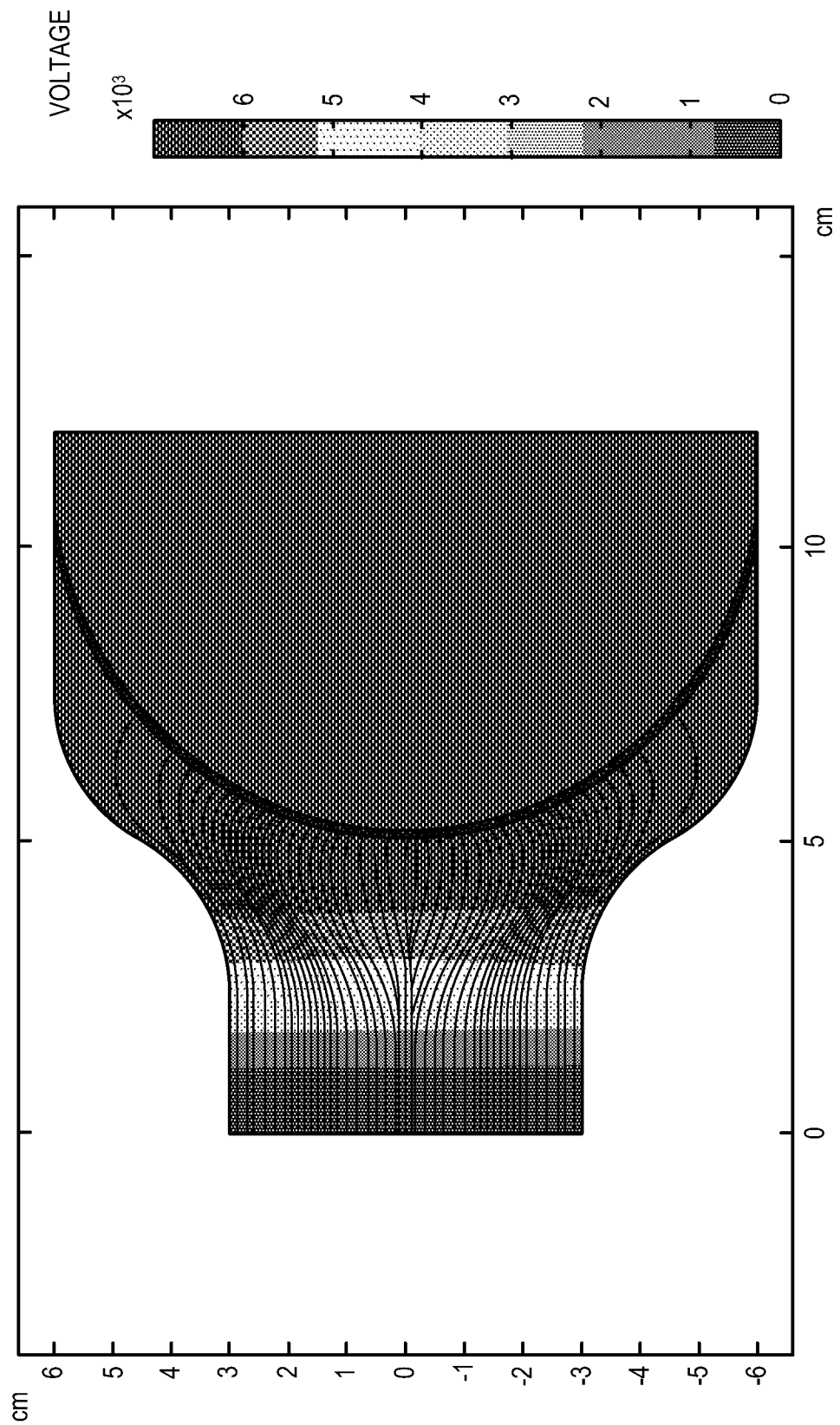

FIGS. 8A and 8B compare arrangements of the source electrode and the sink electrode to generate an electrical field according to exemplary embodiments of the present disclosure. In FIGS. 8A and 8B, the duct may be a diverging duct to impede (e.g., slow down) the air flow. The diverging duct may cause the pressure to increase and facilitate the condensation of water. FIG. 8A is an example of the sink electrode configured to be convex toward a downstream direction of the air flow and FIG. 8B is an example of the sink electrode configured to be concave toward the downstream direction of the air flow. It can be seen that a more smoothly-varying electrical field may be created when the sink electrode is configured to be convex toward the downstream direction of the air flow. Moreover, the applied voltage is an order of magnitude higher in FIG. 8A (convex configuration) than in FIG. 8B (concave configuration). Accordingly, the water vapor may be directed toward the sink electrode more effectively when the sink electrode is configured to be convex toward the downstream direction of the air flow. However, the foregoing configuration is merely an example, and the electrodes may be configured such that an electrical field with a particular configuration may be formed based on the operational requirements.

The subject matter described herein provides many technical advantages. For example, using the current subject matter, surrounding air may not be ionized, thereby limiting or preventing production of gases such as ozone ($O_3$), nitric oxide (NO), nitrogen dioxide ($NO_2$), and nitric acid ($HNO_3$). Further processing or treatment of collected liquid to address these toxic, corrosive, and environmentally dangerous compounds can be minimized or omitted. In addition, because the current subject matter can utilize lower voltages compared to some conventional systems, the current subject matter can be safer, may not waste large amounts of energy, and may not interfere with neighboring electronic instruments. Moreover, unlike some conventional approaches, the current subject matter does not pose a concern for explosion when the system is surrounded by debris with high surface areas (e.g., dust particles) and/or loose articles.

Another aspect of the present disclosure provides a system and a method of monitoring and controlling a cooling tower system. The cooling tower is a heat exchanging system to dissipate heat through cooling a water stream (hot stream) to a lower temperature stream (cooled stream). Industrial cooling towers are typically used in power plants, petroleum refineries, petrochemical plants, natural gas processing plants, food processing plants, semi-conductor plants, and cement manufacturing plants. A cooling tower monitoring system (CTMS) according to an exemplary embodiment of the present disclosure may measure and analyze various parameters of the cooling tower, and provide a detailed monitoring of the performance of the cooling tower based on a comparison of the measured parameters with specification parameters of the cooling tower. The CTMS of the present disclosure may provide a single package solution to monitor and control the cooling tower operation to improve the overall cooling efficiency, increase longevity of the system by controlling the acidity of the cooled water, and reduce pollutant emissions from the cooling tower. The CTMS of the present disclosure may be installed at the time when a new cooling tower is built or may be retrofitted to existing cooling towers with minimal modifications to the existing cooling towers.

In a wet cooling tower (or open circuit cooling tower), the hot water may be cooled to a temperature lower than the ambient air dry-bulb temperature, if the air is relatively dry. As ambient air is drawn past a flow of water, a small portion of the water evaporates, and the energy required to evaporate that portion of the water is taken from the remaining mass of water, thus decreasing its temperature. Evaporation results in saturated air conditions, lowering the temperature of the water processed by the cooling tower to a value close to wet-bulb temperature, which is lower than the ambient dry-bulb temperature, and the difference is determined by the initial humidity of the ambient air.

Figure 10:
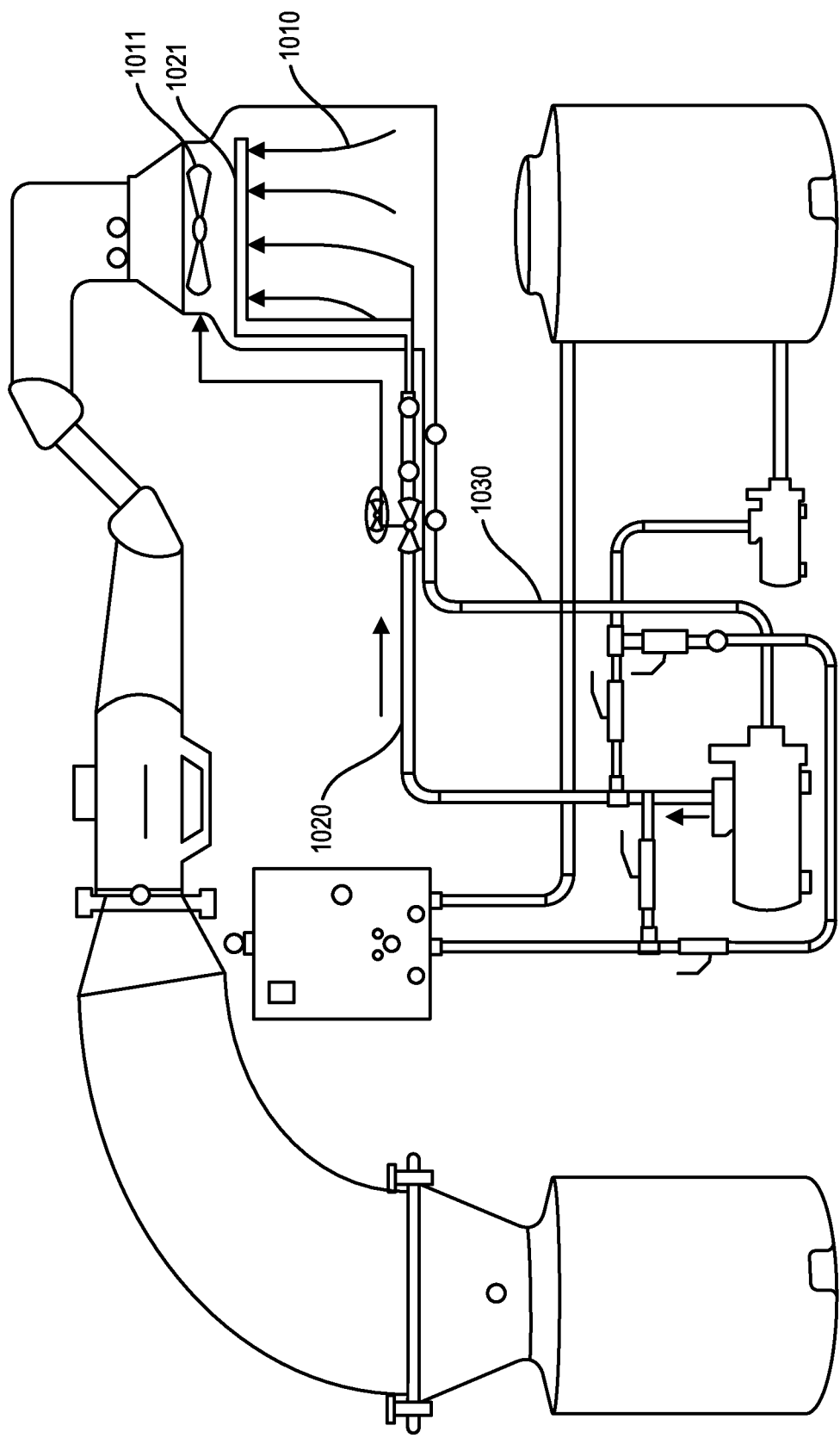
Figure 11:
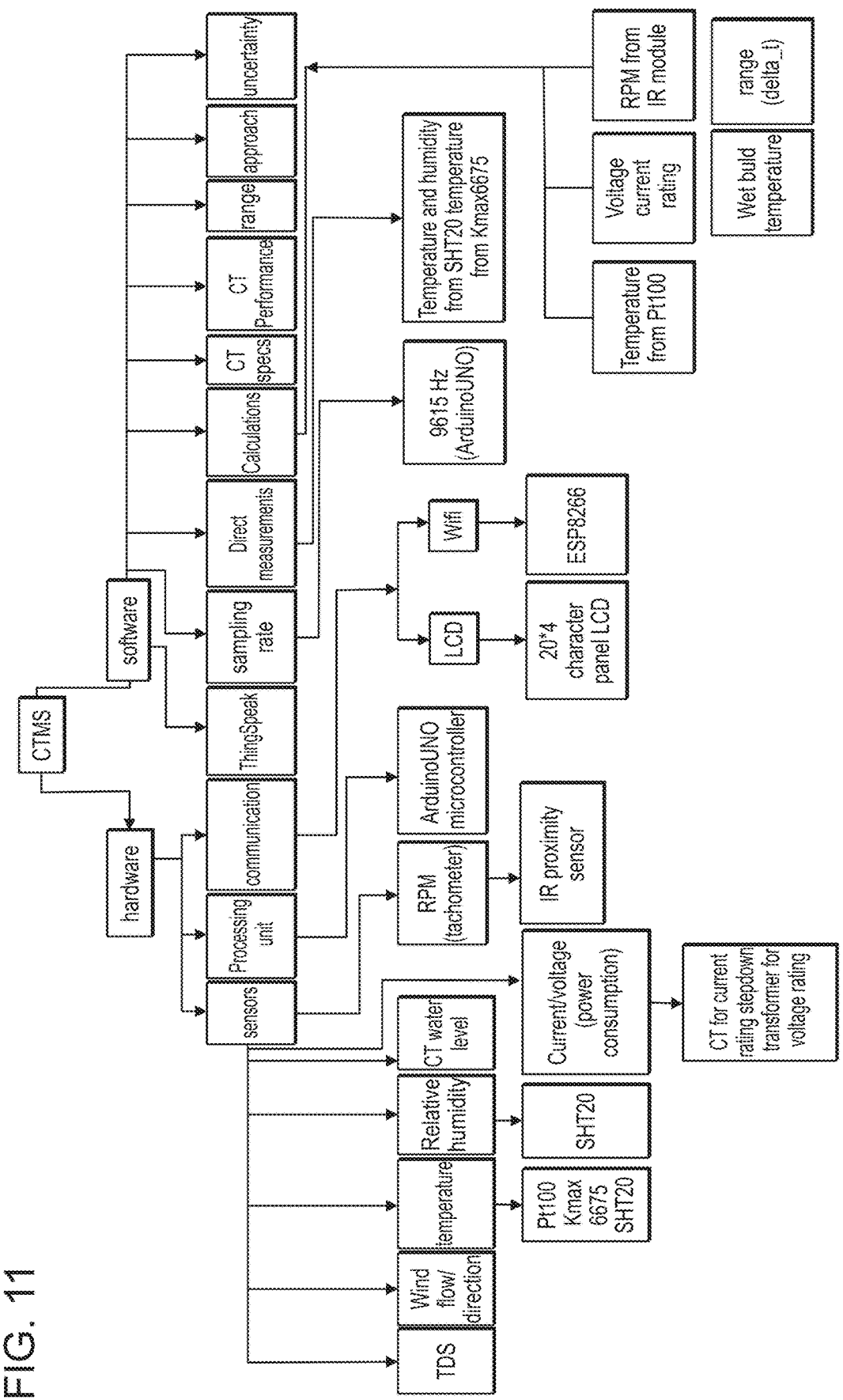

FIG. 10 shows a schematic view of a CTMS according to an exemplary embodiment of the present disclosure. Referring to FIG. 10, a hot water stream 1020 may be supplied to a cooling tower 1010. The hot water may be sprayed down by a spray head 1021. A fan 1011 provides an updraft of fresh air to cool the water. The water that has been cooled within the cooling tower 1010 may be returned through a cooled water stream 1030. FIG. 11 lists various elements of the CTMS according to an exemplary embodiment of the present disclosure. There may be hardware elements and software elements, and the hardware elements may include sensors, processing unit, and communication components.

Hereinbelow, the sensor and the controller elements of the CTMS will be described. The CTMS according to an exemplary embodiment of the present disclosure may include a suite of sensors to monitor the health of a cooling tower. The suite of sensors may include a temperature sensor, a humidity sensor, a water level sensor, a tachometer, a voltage sensor, a current sensor, a pressure sensor, an anemometer, a water flow meter, or the like. The CTMS may further include a processor. A wired and/or a wireless communication system may also be included in the CTMS.

The temperature sensor may include a resistance temperature detector (RTD), e.g., Pt-100, or a thermocouple. In order to read the temperature data from the temperature sensors, a cold-junction compensated thermocouple reader may be used. For example, K-MAX 6675 may provide temperature data from the signal of type-K thermocouples. The temperature sensor may be combined or packaged with the humidity sensor such as SHT-20. An ultrasonic-type sensor such as HC-SR04 may be used as the water level sensor. To measure a rotational speed (rpm) of a fan of the cooling tower system, a tachometer may be used. Various types of tachometers, including a contact-type and a non-contact-type, may be used. When the CTMS is retrofitted to an existing cooling tower, non-contact-type tachometers may provide convenience over the contact-type tachometers. As such, an infrared-based tachometer may be used. To measure a power consumption of the cooling tower system, the voltage meter and/or the current meter may be included in the sensor suite of the CTMS. A barometric pressure sensor such as BMP-180 may be used as the pressure sensor to measure the pressure within the cooling tower system.

To collect the data from the sensors, process the sensor data, and generate control signals to operate the CTMS, a processor or a microcontroller may be included in the CTMS. The CTMS may include display devices to display the sensor data and/or the control parameters and to provide a user interface. Further, the CTMS may wirelessly communicate with some or all of the sensors through an Internet-of-Thing (IoT) platform. The sensor data and/or the control parameters may be displayed, calculated, and inputted through a software interface. The software interface may be implemented as a native software package or using a commercial control software such as Matlab or Labview. The software interface may determine the control parameters based on an algorithm to optimize the performance of the cooling tower. In determining the control parameters from the sensor measurement data, a parametric uncertainty analysis may be used.

In operation, as shown in FIG. 12, the CTMS may measure a first temperature of a cooled stream 1110 and a second temperature of a hot stream 1120, and may calculate a temperature difference between the first temperature and the second temperature. A first temperature sensor 1111 may measure the first temperature, and a second temperature sensor 1121 may measure the second temperature. Subsequently, the CTMS may adjust a first flow rate of the cooled stream 1110 and/or a second flow rate of the hot stream 1120 to allow the temperature difference between the cooled stream 1110 and the hot stream 1120 to correspond to a target temperature difference between the first temperature and the second temperature. To adjust the flow rates of the cooled stream 1110 and the hot stream 1120, a first valve 1112 and a second valve 1122 may be respectively used. The first valve 1112 and the second valve 1122 may be configured as a globe valve. For an automated operation and computerized control, the globe valve may be fitted with a solenoid actuator and operated by the controller.

In order to adjust the first temperature of the cooled stream, the CTMS may add a makeup stream 1130 into the cooled stream 1110. A mixing ratio of the makeup stream 1130 and the cooled stream 1110 may be determined based on the temperature difference between the first temperature and the second temperature. Herein, the makeup stream 1130 refers to a supply of water to replenish the water that evaporates and leaves the cooling tower, and the makeup stream 1130 may be supplied from any fresh water source. A third temperature sensor 1131 may provide a temperature data of the makeup stream 1130, and a third valve 1132 may adjust the flow rate of the makeup stream 1130. To more accurately control the CTMS, a fourth temperature sensor 1136 may be included at downstream of a heat exchanger 1140. In FIG. 12, both of the second temperature sensor 1121 and the fourth temperature sensor 1136 are shown to be disposed at downstream of the heat exchanger 1140. However, the position of the temperature sensors are not limited thereto, and one or both of the second temperature sensor 1121 and the fourth temperature sensor 1136 may be disposed at upstream of the heat exchanger 1140. Similarly, the second valve 1122 may be disposed at upstream of the heat exchanger 1140. In some implementations, heat exchanger 1140 can be omitted.

Further, to adjust the cooled stream temperature, a rotational speed of a fan 1150 of the cooling tower may be monitored and adjusted. To measure the rotational speed of the fan 1150, the tachometer 1190, e.g., infrared-based tachometer, may be used. The change of the fan speed may adjust a flow rate of cooling air, and thereby adjust the first temperature of the cooled stream 1110. Additionally, relatively humidity of the incoming air may be measured with a humidity sensor 1180.

Due to mineral accumulation, such as calcium carbonate, the cooled water stream of the cooling tower may become alkaline. In some implementations, an acidity/alkalinity (pH) of the cooled water may be monitored and controlled using a pH meter 1160. The acidity (or alkalinity) of the cooled water is an important factor that affects overall performance, longevity, and/or environmental impact of the cooling tower system. Accordingly, the CTMS may measure an acidity of the cooled stream 1110 and adjust the acidity by controlling the mixing ratio of the makeup stream 1130 and the cooled stream 1110. In addition to the pH measurement, the hardness of water may also be measured and controlled by the CTMS. In some implementations, the CTMS may also include a water level sensor 1170.

In some embodiments, a wind turbine, such as the one described above, may be added at the downstream of the fan 1150. The wind turbine may extract some enthalpy of the exhaust stream leaving the cooling tower, and convert it to electrical power. The scavenged electrical power may be recuperated to the CTMS system, and thereby increasing an overall power efficiency of the system.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   a source electrode electrically connected to an electrical source that applies an electrical voltage to the source electrode;

a condenser including a sink electrode to collect aerosol contained in an air stream; and a duct configured to direct the aerosol to the condenser, wherein the source electrode and the sink electrode are configured to create an electrical field within the duct having a strength below a corona discharge threshold of 3 kV/mm.

2. The system of claim 1, wherein the source electrode includes a source mesh, the source mesh including a first network of wires.

3. The system of claim 2, wherein the source mesh includes a wire diameter of between 0.5 mm and 5 mm.

4. The system of claim 2, wherein a characteristic dimension of an opening of the source mesh is between 1 mm and 15 mm.

5. The system of claim 2, wherein the source mesh includes stainless steel, nickel, conductive polymer, or conductive silicone.

6. The system of claim 2, wherein the source mesh comprises a plurality of layers each of which including a network of wires.

7. The system of claim 1, wherein the sink electrode includes a condensing mesh, the condensing mesh including a second network of wires.

8. The system of claim 7, wherein the sink electrode is configured to condense the aerosol on the condensing mesh to form droplets, which precipitate by at least gravity.

9. The system of claim 8, wherein the condenser comprises:

an inlet configured to receive an air stream having a first relative humidity;

an outlet configured to discharge an air stream having a second relative humidity which is lower than the first relative humidity; and a reservoir configured to collect the droplets.

10. The system of claim 7, wherein the condensing mesh includes a wire diameter of between 0.5 mm and 5 mm.

11. The system of claim 7, wherein a characteristic dimension of an opening of the condensing mesh is between 1 mm and 15 mm.

12. The system of claim 7, wherein the condensing mesh includes stainless steel, nickel, conductive polymer, or conductive silicone.

13. The system of claim 7, wherein the condensing mesh comprises a plurality of layers each of which includes a network of wires.

14. The system of claim 1, wherein the electrical source includes a direct current (DC) power supply.

15. The system of claim 1, wherein the electrical source includes a direct current (DC) power supply that generates a voltage between 20 V and 10 kV.

16. The system of claim 1, wherein the sink electrode is electrically grounded.

17. The system of claim 1, wherein the sink electrode is connected to an opposite electrical source that imparts an opposite electrical charge to the sink electrode.

18. The system of claim 1, further comprising:

a blower configured to drive the air stream that contains the aerosol through the source electrode and to the condenser along the duct.

19. The system of claim 1, wherein a cross-sectional area of the duct increases along a flow direction of the air stream.

20. The system of claim 19, wherein the sink electrode includes a convex shape that protrudes toward the flow direction of the air stream.

* * * * *